United States Patent [19]

Morrow

[11] Patent Number: 4,519,705
[45] Date of Patent: May 28, 1985

[54] SIGHTING CAP FOR ROTATING LASER BEAM TRANSMITTER

[75] Inventor: Robert J. P. Morrow, Huber Heights, Ohio

[73] Assignee: Spetra-Physics, Inc., Mountain View, Calif.

[21] Appl. No.: 418,650

[22] Filed: Sep. 16, 1982

[51] Int. Cl.³ .............................. G01B 11/26
[52] U.S. Cl. ...................... 356/138; 33/286; 33/DIG. 21
[58] Field of Search ............... 356/138, 152, 399, 400; 33/245, 286, DIG. 21

[56] References Cited

U.S. PATENT DOCUMENTS

| | | | |
|---|---|---|---|
| 3,463,430 | 8/1969 | Rubin et al. | 33/245 |
| 3,588,249 | 6/1971 | Studebaker | 350/484 X |
| 3,865,491 | 2/1975 | Hogan | 356/400 X |
| 3,875,675 | 4/1975 | Krisay | 33/245 |
| 3,936,197 | 2/1976 | Aldrink et al. | 356/399 |
| 4,035,084 | 7/1977 | Ramsay | 356/400 |
| 4,062,634 | 12/1977 | Rando et al. | 356/149 |

FOREIGN PATENT DOCUMENTS 1572356  7/1980  United Kingdom ............... 33/245

Primary Examiner—F. L. Evans
Attorney, Agent, or Firm—Fraser & Clemens

[57] ABSTRACT

A sighting cap is provided for the stationary housing of a rotating laser beam transmitter. The sighting cap has two pairs of legs respectively defining vertical sighting slots. Two of the sighting slots are aligned with the X axis of the laser beam positioning mechanism and the other two slots are aligned with the Y axis of the laser beam positioning mechanism. A sighting post is established in the work area to define a line between the axis of rotation of the rotating laser beam transmitter and the sighting post which is parallel to the X or Y axis of a previously conducted survey of the work area. Sighting through the sighting slots, accompanied by adjustment of the angular position of the stationary housing permits the precise alignment of the sighting slots, hence the positional axis of the laser beam plane adjusting mechanism, in parallel relationship with the survey axes.

7 Claims, 5 Drawing Figures

SIGHTING CAP FOR ROTATING LASER BEAM TRANSMITTER

BACKGROUND OF THE INVENTION

1. Field of the Invention

The invention relates to a sighting cap mountable on a housing of a laser beam transmitter which effects the rotation of the laser beam about a generally vertical axis of rotation, the cap being provided with diametrically opposed slots permitting the visual alignment of the housing, and hence the plane to be generated by the rotating laser beam, with a remote sighting post.

2. Background of the Invention

Apparatus employing a rotating laser beam for effecting surveying operations or the guidance and/or control of earth working implements disposed on the terrain over which the rotating laser beam is traversed, was first introduced in the late 1960's. See, for example, U.S. Pat. Nos. 3,588,249 to Studebaker, 3,865,491 to Hogan, 3,936,197 to Aldrink et al and U.S. Pat. No. 4,062,634 to Rando et al. Such devices commonly employed a generally vertically disposed laser beam generator mounted in a stationary housing which was connected to support legs by a transit-like adjusting mechanism, permitting the position of the vertical axis of the stationary housing or the generated laser beam to be conveniently adjusted. The actual rotation of the laser beam was accomplished by a rotating pentaprism that was journalled in the stationary housing for rotation about the vertical axis of the generated laser beam. The angular position of the reference plane generated by the rotating laser beam was then determined by the adjustment of the vertical axis of the generated laser beam or the stationary housing containing the laser beam generator.

Whenever it is desired that the plane of the rotating laser beam be disposed at an angle relative to the vertical other than 90°, and this is the most common situation encountered, it is necessary to effect the displacement of the rotational axis of the generated laser beam with respect to the vertical so that the resulting rotating laser beam occupies the desired non-horizontal plane.

In the past, the apparatus was first set up in the work area with the axis of the generated laser beam disposed in a true vertical position. Micrometer adjustment of the transit-type positioning mechanisms effecting the mounting of the laser beam generating apparatus or the stationary housing to the support legs would then produce a tilting of the housing by pre-calculated amounts along two horizontal axes to effect the disposition of the axis of the generated laser beam in a perpendicular position relative to the desired plane of rotation of the rotating laser beam. This method necessarily required some trigonometric calculation of the amount of micrometer adjustment of the transit-type positioning mechanism, or reference to a pre-calculated table, which had to be carried with the transmitter. If any change in the angularity of the rotating laser beam plane were desired, the reference to the calculation table and the micrometer adjustments would have to be repeated. Such procedures obviously are not advantageously employed in field operations.

It is also possible to set up two spaced beam detectors respectively defining the desired elevation of the rotating laser plane at two points remote from the location of the rotational axis of the rotating laser beam plane. The operator would then adjust the angular position of the rotational axis of the rotating laser beam to attempt to cause the resulting beam to traverse the center of each of the two beam detectors at the desired elevational position. Again, a time consuming procedure was involved and a minimum of two operators were required; one at the transmitter and another at the elevation markers.

In recent years, more sophisticated rotating laser beam transmitters have been commercially available from Laserplane Corporation of Dayton, Ohio, the most recent being marketed under the trademark "LASERLEVEL" Model 1045DSL transmitter. In this transmitter, the micrometer adjustments of the vertical axis of the laser beam generator and the rotating pentaprism are effected by two electrically powered motors which respectively effect adjustment of the rotational axis of the laser beam in two 90° displaced vertical planes. Thus, if the desired angular relationship of the rotating laser beam plane with respect to two horizontal axes is known, the motors may be respectively actuated by push buttons contained on a hand held controller and the degree of angularity with respect to each of the two 90° displaced axes will be indicated on a electronically actuated display panel located on the hand held controller.

Even with this sophisticated mechanism for selectively positioning the plane of a rotating laser beam over a range of desired angular relationships with respect to the true vertical, it is necessary to survey the work area to determine the location of the X and Y axes and the displacements of the desired laser beam plane relative to such axes. The laser beam transmitter is then located on the work area at a known position relative to the survey axes and the corresponding beam adjustment axes of the transmitter placed in parallel relationship to the survey axes. Inexpensive yet accurate means for effecting such alignment of the transmitter adjustment axes with the survey axes have not been heretofore available.

SUMMARY OF THE INVENTION

This invention provides a sighting apparatus for effecting the rapid alignment of a rotating laser beam transmitter with respect to pre-surveyed axes for a work area through simple sighting observations made by a single operator with respect to at least one remotely positioned sighting post which defines a line, extending between the rotating axis of the laser beam and the sighting post, that is parallel to either the X or Y axis of the work area survey. The housing containing the pentaprism, which effects the rotation of the generated laser beam, is also angularly adjustable about the axis of the rotating pentaprism and is provided with a sighting cap. Such sighting cap defines two diametrically opposed sighting slots which are respectively aligned with the X and Y axes of the laser beam plane adjusting mechanism contained in the housing. The sighting slots may be utilized by the operator to visually align one of the positioning axes with one of the survey axes which by definition aligns the second positioning axis with the other survey axis. No operator is required to be located at the remote sighting post inasmuch as the transmitter operator merely visually sights through the aligned slots and then adjusts the angular position of the housing from which the rotating laser beam emanates so that his line of sight is coincident with a vertical line on the sighting post.

The described operation results in an alignment of the transmitter axes with the survey axis. If greater accuracy is desired, a telescope is then rigidly inserted in place on the sighting cap, in axial parallelism with the sighting axis defined by the opposed sighting slots, and the precise alignment of the positioning axes of the plane of the rotating laser beam with respect to the survey axes may be accomplished by the operator by sighting the vertical line on the remote post through the telescope and further adjusting the angular position of the pentaprism housing. Of course, the necessary adjustments of the vertical angular position of the rotational axis of the rotating laser beam to produce the desired reference plane is accomplished by the motor driven, transit-type adjustments conventionally provided in the prior art structures.

Further objects and advantages of the invention will be readily apparent to those skilled in the art from the following detailed description, taken in conjunction with the annexed sheets of drawings, on which is shown a preferred example of the invention.

DESCRIPTION OF PREFERRED EMBODIMENT

Figure 1:
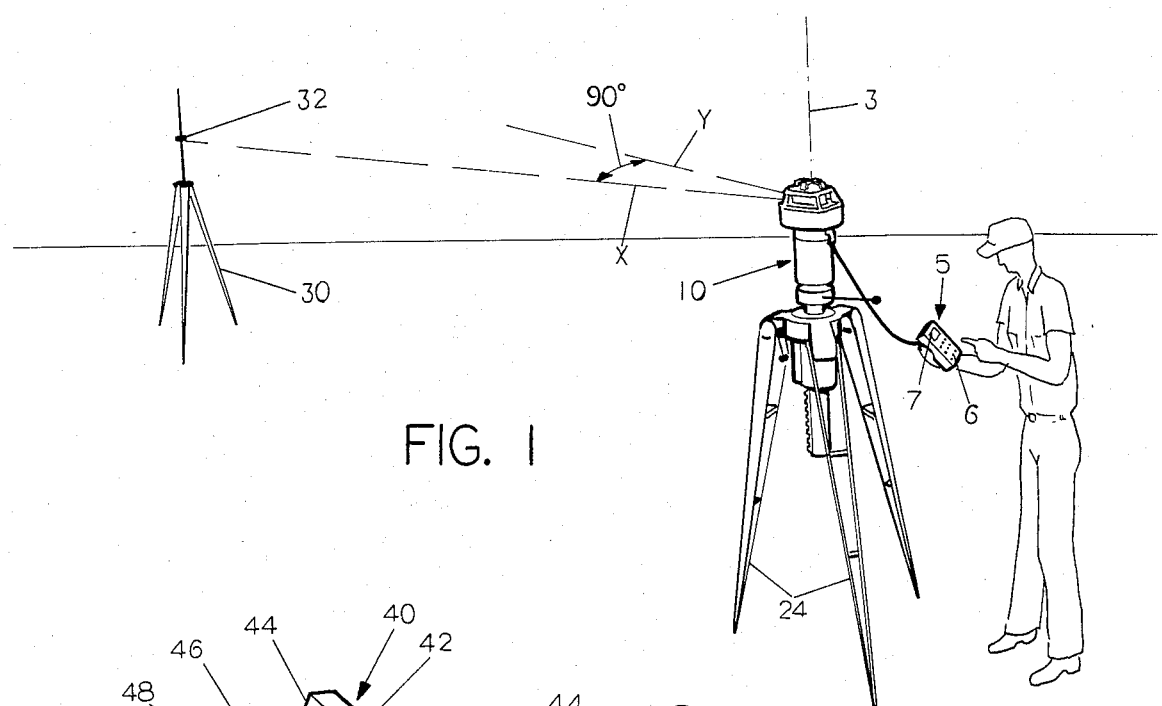
FIG. 1 is a schematic perspective view illustrating a field setup of a rotating laser beam transmitter and an orientation marker or sighting post.
Figure 2:
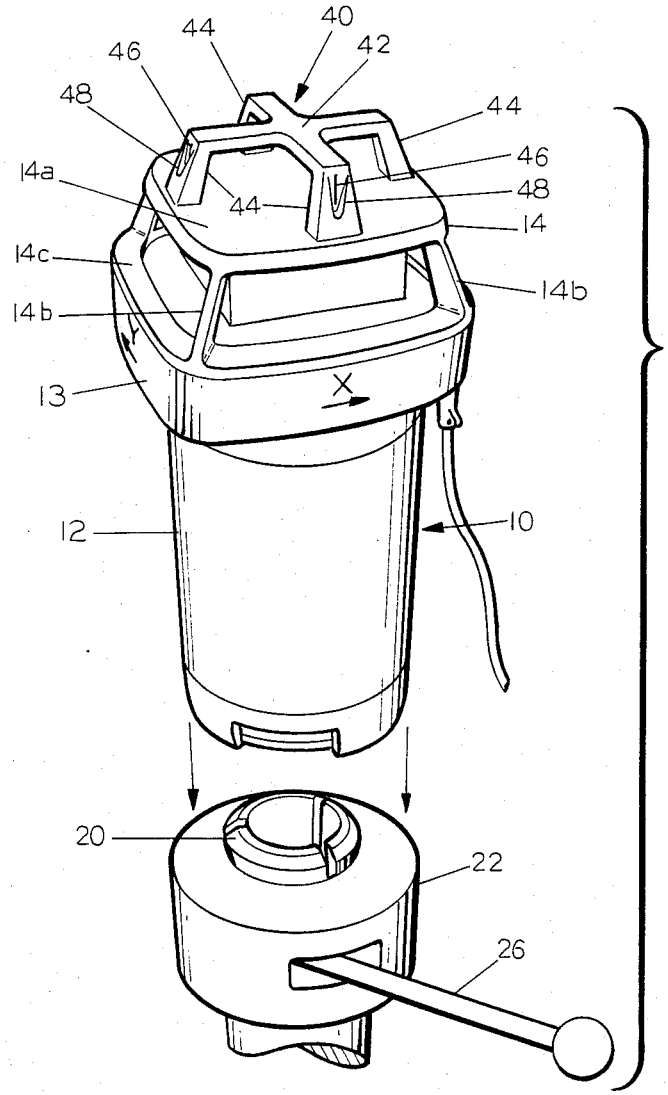
FIG. 2 is an exploded perspective view illustrating the mounting of the head of the rotating laser beam transmitter with respect to a supporting base, and showing the sighting cap embodying this invention.
Figure 5:
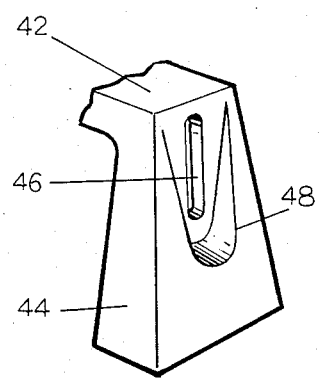
FIG. 5 is an enlarged perspective view of one of the legs on the sighting cap of the rotating laser beam transmitter.

Referring to FIG. 1, a transmitter 10 for generating a rotating laser beam over a range of desired planes with respect to the horizontal is schematically illustrated. Transmitter 10 comprises a type that is commercially available from LASERPLANE CORPORATION of Dayton, Ohio under the trademark "LASER LEVEL, MODEL 1045 DSL". The transmitter 10 incorporates an upper generally cylindrical housing 12 within which a rotating pentaprism (not shown) is mounted, plus conventional motor operated mechanism for effecting angular adjustment with respect to a true horizontal plane of a generated laser beam and rotating pentaprism assembly to produce a rotating laser beam in a desired plane. Such rotating laser beam is emitted through the generally open walls of a top housing assembly 14 comprising a solid top plate 14a and four quadrilaterally spaced support legs 14b connecting to a quadrilateral ring-shaped base element 14c which is secured to a quadrilaterally shaped upper portion 13 of housing 12 by suitable bolts (not shown). The bottom of housing 10 is provided with a mounting ring (not shown) which is freely insertable over the top end of a locking collet 20 provided on a support base 22 which in turn is supported in conventional fashion by tripod legs 24. Collet 20 is expandable or retractable through manipulation of a manually operable control lever 26. Hence, the housing 10 may be fixedly secured to the support housing 22 or, by retracting the collet element 20, the housing 10 may be rotationally adjusted around the axis of the collet 20.

The adjustment of the angular position of the plane generated by the rotating laser beam is controlled in conventional fashion by a hand held controller 5, which carries a plurality of control buttons 6 and a visual display panel 7. The operation of selected control buttons 6 will produce an adjustment of the angular position of the plane of the generated rotating laser beam in either or both 90° displaced axes, hereinafter called the X and Y axes which in turn are mutually perpendicular to a true vertical axis Z. The required tilting of the generated laser beam plane is accomplished by pushing the proper control buttons until the required displacement of the laser beam plane in both the X and Y axes are achieved as indicated by readings on the visual display 7. Such displacements are, of course, determined by a prior survey of the work area. Thus, the rotating laser beam transmitter may be set up in an entirely conventional fashion to generate a rotating laser beam plane traversing a work area at a desired angle to the vertical, but it is often essential that the adjustment axes within housing 10 be conveniently but accurately aligned with the appropriate X and Y axes of the survey by which the desired angular position of the generated laser beam plane with respect to the work area was determined.

At least one sighting post 30 is setup in the work area at a substantial distance from the transmitter 10 so that a line drawn between the sighting post 30 and the transmitter 10 defines either the X or Y axis of the survey grid or is parallel to the X or Y survey axis. It is then necessary to align the beam positioning mechanism contained within the transmitter housing 10 with such X or Y survey axis.

This is conveniently accomplished in accordance with this invention through the provision of a sighting cap 40 mounted on the top of a housing cap 14. Sighting cap 40 has a base portion 42 of generally cruciform configuration and vertical legs 44 are provided at each of the extremities of the cruciform base 42. By having legs 44 depending from base portion 42, the sighting cap also functions as a handle for housing 10. Suitable bolts (not shown) secure the legs 44 to the top plate portion 14a of the housing cap 14.

Each opposed pair of mounting legs 44 is provided with a narrow vertical sighting slot 46 of limited width. One pair of sighting slots 46 is aligned with the X axis of the transmitter positioning mechanism contained within housing 10, while the other pair of sighting slots is aligned with the Y axis.

The housing 10 is released for rotation about the axis on the support housing 22 by manipulation of lever 26 and rotated until the operator can visually align either the X or the Y axis sighting slots 46, as the case may be, with the sighting post 30. The collet 20 is then expanded by operation of control lever 26 and the housing 10 is locked in this position. The accuracy of this visual alignment is of the order of plus or minus 12 arc minutes.

Figures 3, 4:
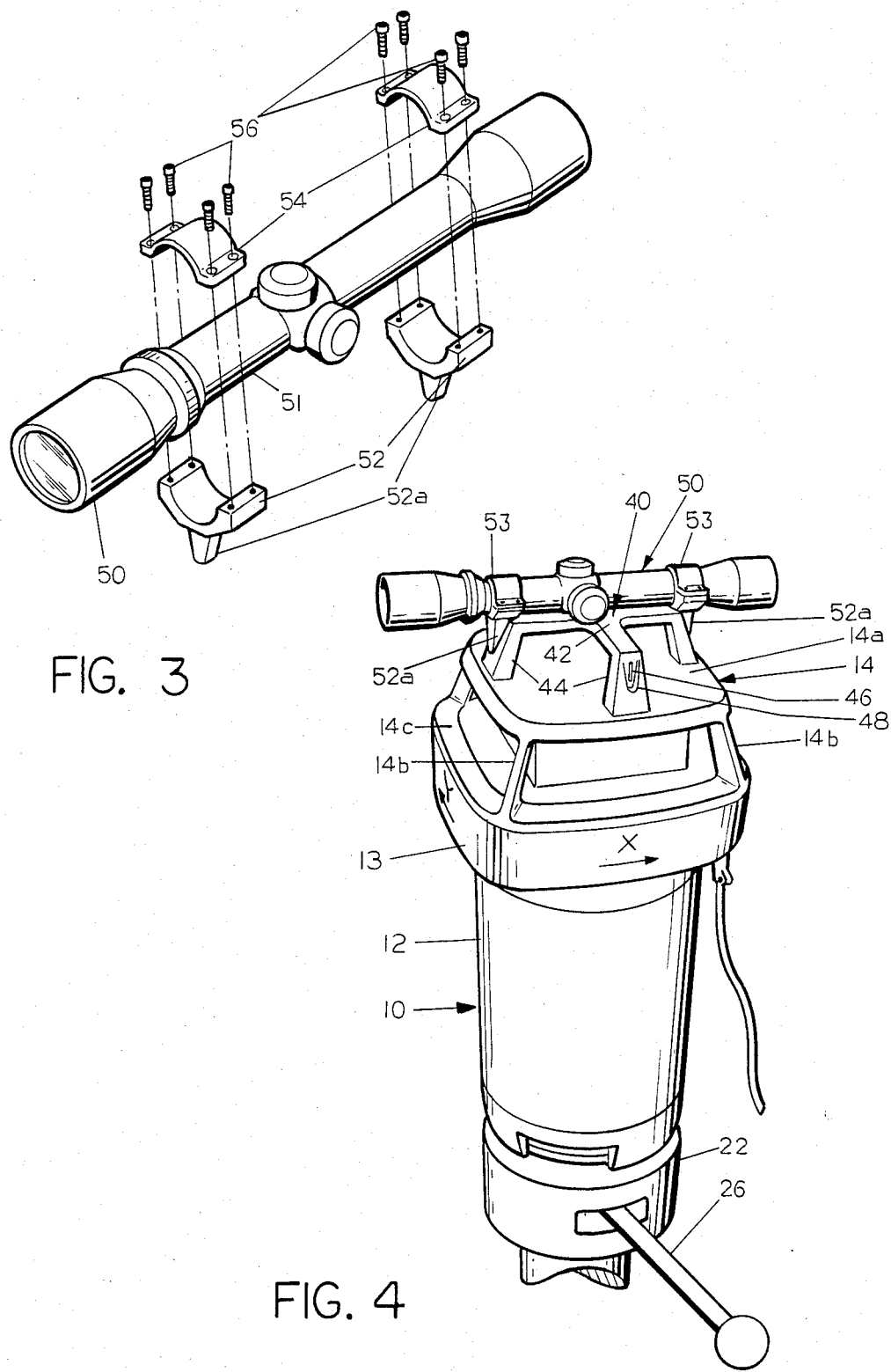
FIG. 3 is an exploded perspective view of a sighting telescope and the mounting brackets therefor.
FIG. 4 is a perspective view illustrating the sighting telescope mounted on the sighting cap of the rotating laser beam transmitter.

If it is desired that the alignment be effected with greater accuracy, a sighting telescope 50 (FIG. 3) may be conveniently employed on sighting cap 40. Scope 50 is provided with a pair of axially spaced mounting brackets 52 which are respectively secured to the barrel portion 51 of the telescope 50 by top brackets 54 and bolts 56. Each mounting bracket 52 is provided with a machined depending tapered portion 52a. Each opposed pair of support legs 44 for the sighting cap 40 are provided with open top slots or recesses 48 respectively aligned with the sighting slots 46 and machined to snugly receive the depending tapered mounting projections 52a of brackets 52 therein. Slots 48 are preferably concentric with sighting slots 46. Hence, the telescope 50 may be snugly mounted on either the pair of support legs 44 corresponding to the X positioning axis of the transmitter or the pair of support legs 44 corresponding to the Y positioning axis of the transmitter. Use of telescope 50 increases the accuracy of alignment to plus or minus 3 arc minutes.

Of course, the sighting post 30 may be aligned with the Y axis of the work area survey and the rotational position of housing 10 adjusted in the same manner as heretofore described. To facilitate such alignment, appropriate legends may be provided on the exterior of the housing such as the designations "X" and "Y" and arrows pointing in the appropriate directions corresponding to such positioning mechanism axes. To further improve the accuracy, a target 32, having a vertical line thereon, may be mounted on sighting post 30.

Those skilled in the art will recognize that the aforedescribed sighting cap provides a simple, economical, yet completely reliable device for effecting the visual alignment of the positioning mechanism axes of a rotating laser beam transmitter with the orthogonal survey co-ordinates established for the particular work area.

What is claimed is:

1. In a rotating laser beam transmitter having a housing unit angularly adjustable about a generally vertical axis of rotation of the laser beam and means for adjusting the vertical angular position of the axis of rotation of the laser beam relative to two fixed horizontal axes in the housing, the improvement comprising: a cap for said housing including a horizontal base plate portion having at least one pair of opposed, vertical legs; means for securing said cap to the top of the transmitter housing with said legs in diametrically opposed relationship to the axis of rotation and in parallel alignment to one of said fixed axes; each pair of said legs respectively defining diametrically aligned vertical sighting slots in parallel alignment with said fixed axis, whereby sighting through said slots at a remote sighting post facilitates angular adjustment of the housing so that said fixed axes are parallel to the surveyed axes of the work area.

2. A sighting cap in accordance with claim 1 wherein said base plate portion is of cruciform configuration and has four legs respectively formed on the four extremities of said base plate.

3. In a rotating laser beam transmitter having a housing unit angularly adjustable about a generally vertical axis of rotation of the laser beam and means for adjusting the vertical angular position of the axis of rotation of the laser beam relative to two fixed horizontal axes in the housing, the improvement comprising: a cap for said housing including a horizontal base plate portion having at least one pair of opposed, vertical legs; means for securing said legs to the top of the transmitter housing in diametrically opposed relationship to the axis of rotation and in parallel alignment to one of said fixed axes; each pair of said legs respectively defining diametrically aligned vertical sighting slots in parallel alignment with said fixed axis, whereby sighting through said slots at a remote sighting post facilitates angular adjustment of the housing so that said fixed axes are parallel to surveyed axes of the work area, a telescope, a pair of support brackets secured to said telescope in axially spaced relation, said opposed pair of vertical legs having open top slots respectively snugly receiving portions of said brackets to rigidly mount said telescope on said sighting cap in axial parallelism with said sighting slots.

4. In a rotating laser beam transmitter having a housing unit angularly adjustable about a generally vertical axis of rotation of the laser beam and means for adjusting the vertical angular position of the axis of rotation relative to two fixed horizontal axes in the housing, the improvement comprising: a cap for said housing including a base plate portion having at least one pair of opposed depending support legs; means for securing said depending support legs to the top of the transmitter rotatable housing in diametrically opposed relationship to the axis of rotation and in parallel alignment to one of said fixed axes; each pair of said depending support legs respectively having diametrically aligned vertical sighting slots defining a sighting path parallel to one of said fixed axes, whereby sighting through said slots at a remote marker facilitates angular adjustment of the housing to align said fixed axes with pre-surveyed axes of the work area.

5. In a rotating laser beam transmitter having a housing unit angularly adjustable about a generally vertical axis of rotation of the laser beam and means for adjusting the vertical angular position of the axis of rotation relative to two fixed horizontal axes in the housing, the improvement comprising: a cap for said housing including a base plate portion having at least one pair of opposed depending support legs; means for securing said depending support legs to the top of the transmitter rotatable housing in diametrically opposed relationship to the axis of rotation and in parallel alignment to one of said fixed axes; each pair of said depending support legs respectively having diametrically aligned vertical sighting slots defining a sighting path parallel to one of said fixed axes, whereby sighting through said slots at a remote marker facilitates angular adjustment of the housing to align said fixed axes with pre-surveyed axes of the work area; a telescope, a pair of support brackets secured to said telescope in spaced relation, said opposed pair of depending support legs having open top slots respectively snugly receiving portions of said brackets to rigidly mount said telescope on said sighting cap in axial parallelism with said sighting slots.

6. A sighting cap in accordance with claim 4 or 5 wherein said base plate portion is of cruciform configuration and has four said depending support legs respectively formed on the four extremities of said base plate.

7. A sighting cap in accordance with claim 3 or 5 wherein said open top slots are respectively concentrically aligned with said sighting slots.

* * * * *